United States Patent [19]

Marzouki et al.

[11] 4,268,553
[45] May 19, 1981

[54] METHOD FOR DOUBLE GLAZING UNITS

[75] Inventors: Taieb Marzouki, Chonberg; Bernd Schweisser, Oberursel, both of Fed. Rep. of Germany

[73] Assignee: USM Corporation, Farmington, Conn.

[21] Appl. No.: 26,065

[22] Filed: Apr. 2, 1979

[30] Foreign Application Priority Data

Apr. 5, 1978 [GB] United Kingdom ............... 13235/78

[51] Int. Cl.³ .......................... E06B 3/24; E06B 3/64
[52] U.S. Cl. ........................................ 428/34; 52/208; 52/790; 156/107; 156/109; 156/310; 428/441; 428/461
[58] Field of Search ....................... 156/107, 109, 310; 428/34, 420, 441, 461, 462; 52/790, 171, 172, 208, 304, 398

[56] References Cited

U.S. PATENT DOCUMENTS

| | | | |
|---|---|---|---|
| 3,406,087 | 10/1968 | Potter | 428/413 |
| 3,832,254 | 8/1974 | Bowser et al. | 428/34 |
| 3,852,149 | 12/1974 | Sitter et al. | 428/34 |
| 3,870,676 | 3/1975 | Condon | 260/30.4 A |
| 3,984,369 | 10/1976 | Harlan, Jr. et al. | 260/33.6 AQ |
| 4,032,489 | 6/1977 | Haverstreng | 156/109 |
| 4,042,736 | 8/1977 | Flint | 428/34 |
| 4,109,431 | 8/1978 | Mazzoni et al. | 428/34 |
| 4,109,432 | 8/1978 | Pilz | 428/34 |
| 4,126,504 | 11/1978 | Wolinski et al. | 156/310 |

FOREIGN PATENT DOCUMENTS

| | | | |
|---|---|---|---|
| 1227943 | 4/1971 | United Kingdom | 428/34 |
| 1384127 | 2/1975 | United Kingdom | 428/34 |
| 1477576 | 6/1977 | United Kingdom | 428/34 |

*Primary Examiner*—William J. Van Balen
*Attorney, Agent, or Firm*—John P. Morley; Vincent A. White

[57] ABSTRACT

An improved method for preparing multi-pane glazing units using a two-part adhesive system and improved glazing units prepared by the method.

30 Claims, 17 Drawing Figures

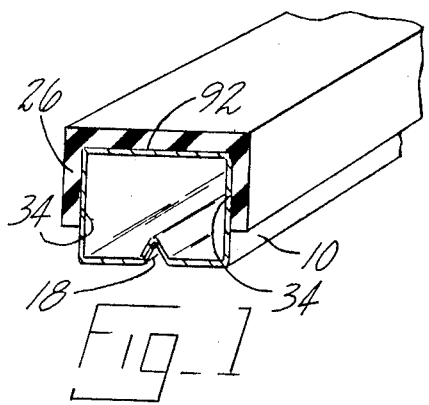
Fig_1
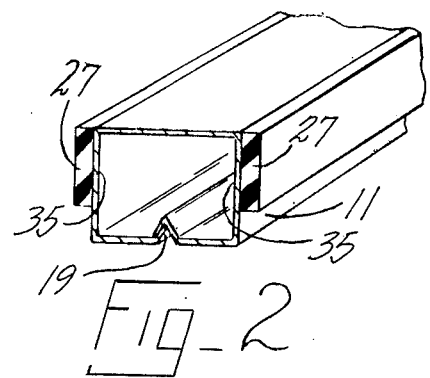
Fig_2
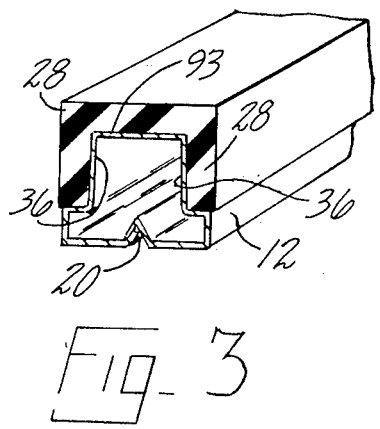
Fig_3
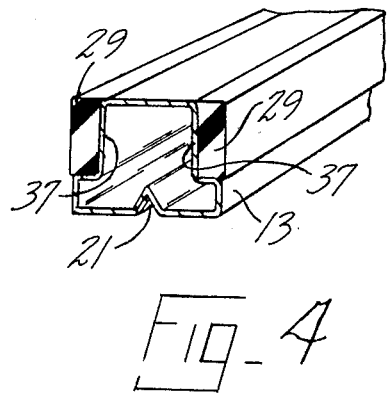
Fig_4
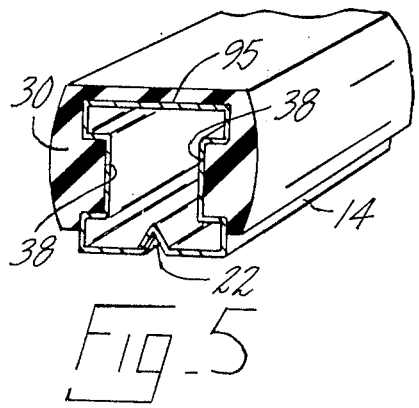
Fig_5
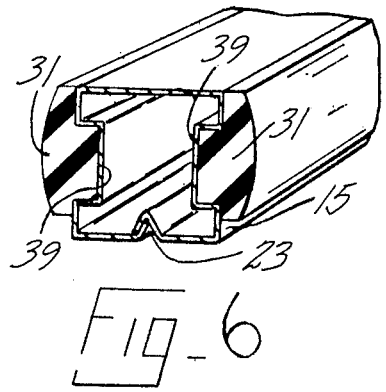
Fig_6

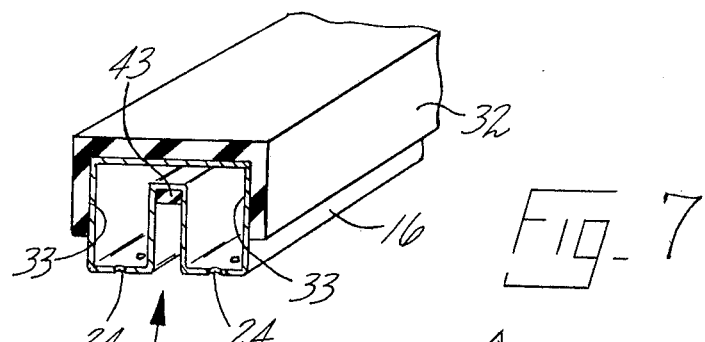
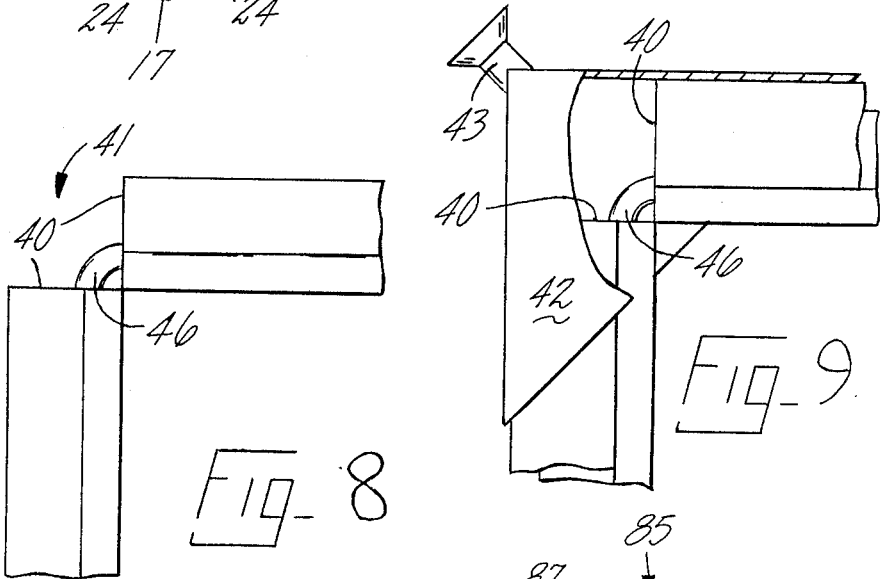
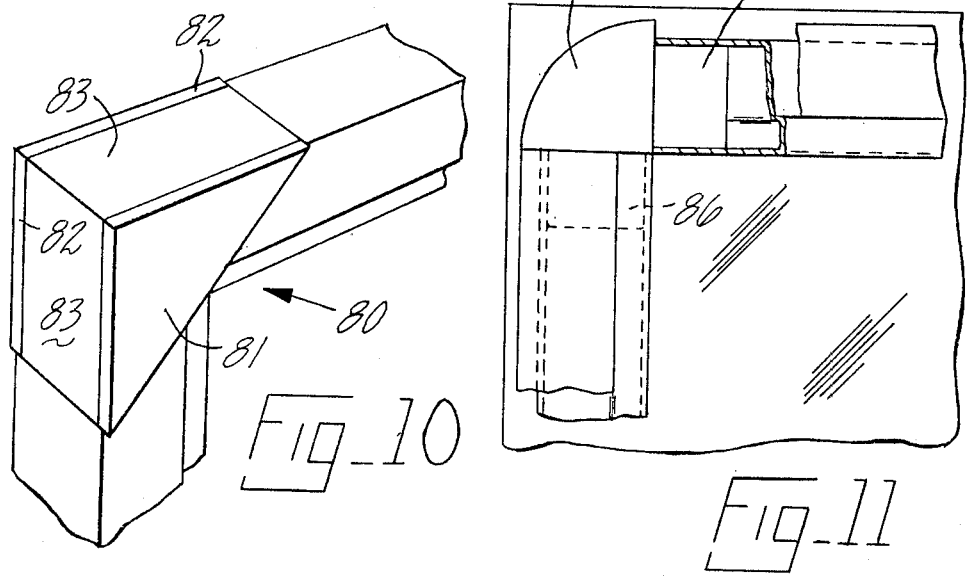

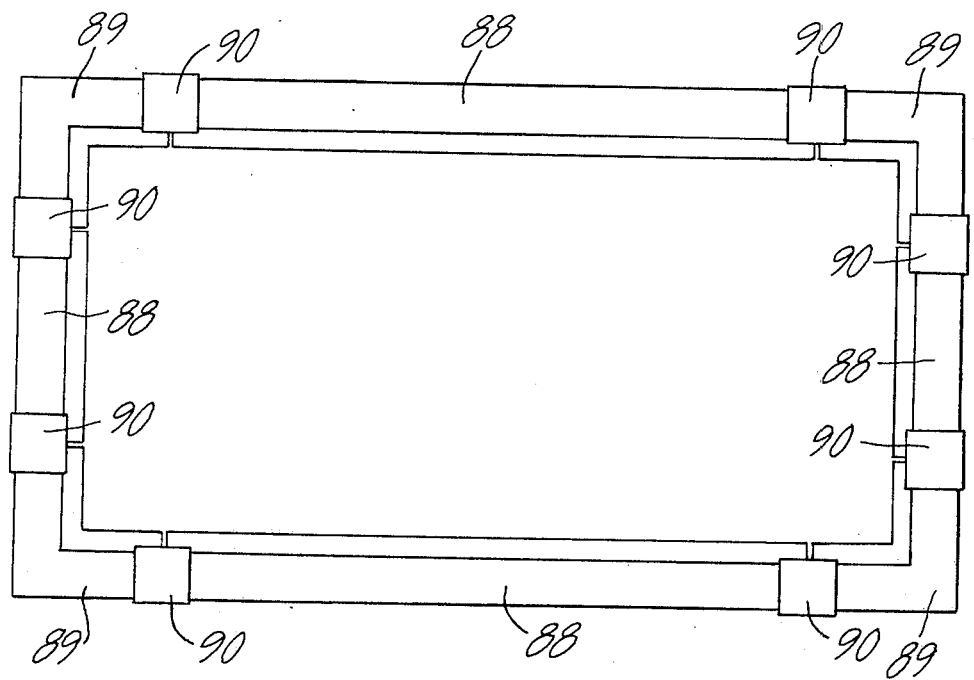
Fig_12
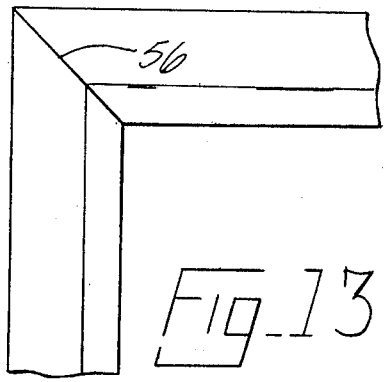
Fig_13
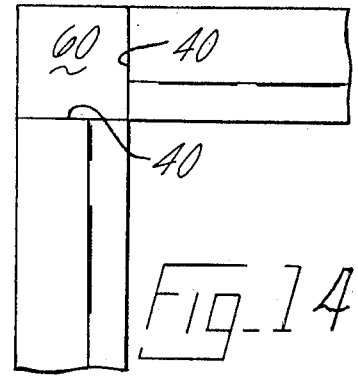
Fig_14

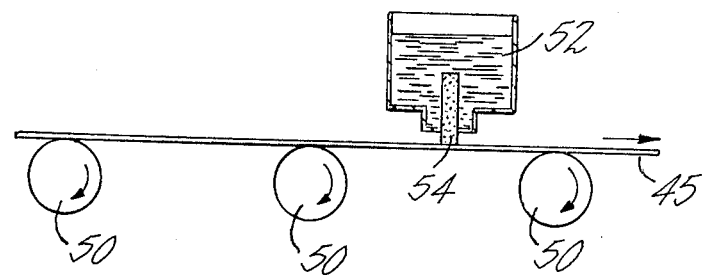
Fig_15
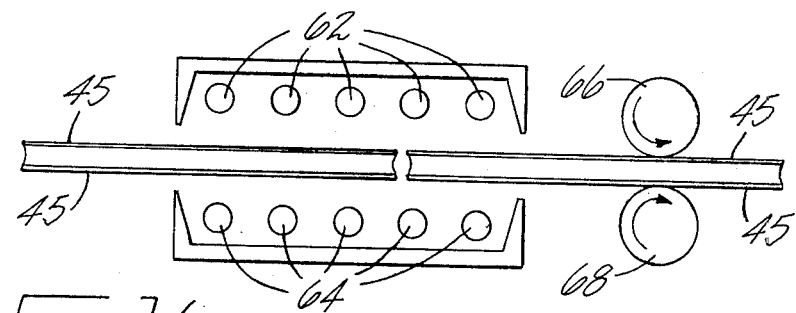
Fig_16
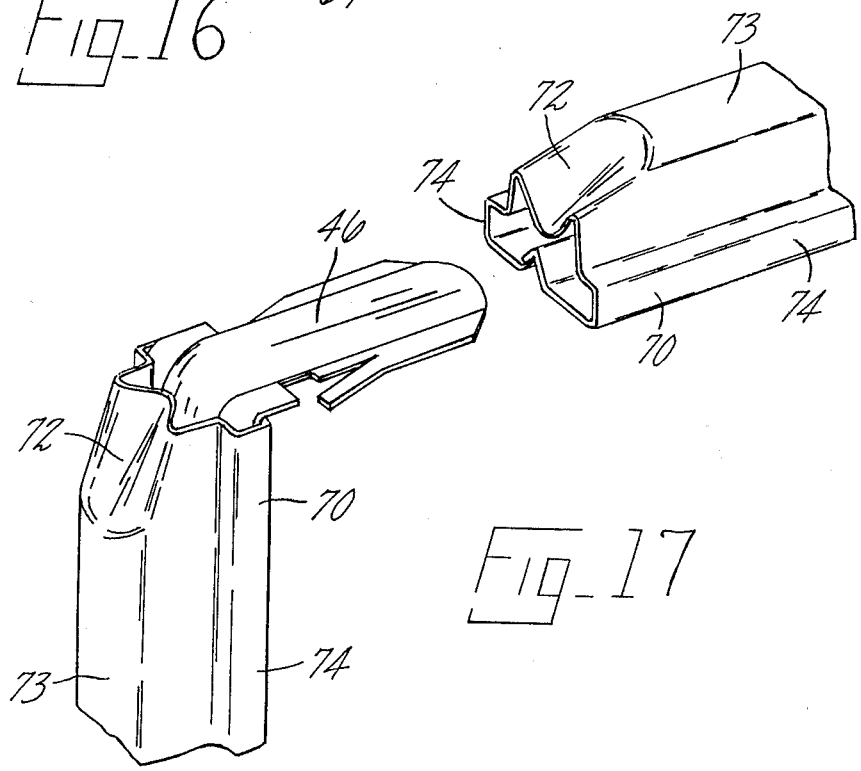
Fig_17

METHOD FOR DOUBLE GLAZING UNITS

The Field of the Invention

This invention relates to improved methods for manufacturing multiglass panes or double glazing units and to improved units manufactured by the methods.

DESCRIPTION OF THE PRIOR ART

Multi-pane glazing units having glass panes separated by spacers and sealed with sealant compositions of various kinds are known to the art. The performance characteristics of sealant compositions suitable for use in multi-pane glazing units are well defined. The sealant must effectively seal or bond the glass and the spacer together (even at high temperatures and in the absence of additional support for the panes as may occur during storage) and provide a satisfactory seal against diffusion of water vapor. Additionally, the seal must retain these performance characteristics over a wide range of temperatures, e.g. in the range of minus 30° C. to plus 60° C. Moreover, it is also desirable that the sealant composition can be applied effectively and with ease, with a minimum of skill and without waste of material.

U.K. Pat. No. 993,963 discloses sealant compositions based on curable polysulphide compounds for double glazing. Such sealants have been used to provide satisfactory cured seals with good adhesion to glass and metal and good resistance to environmental temperature change. However, the disclosed materials are comparatively expensive, and when mixed they commence to cure immediately. Accordingly, metering and mixing of two parts are required just prior to application as a fluid to the edge of the unit. Additionally, it is necessary for these materials to be cured, at least to some extent, before the units can be safely handled and transported. This cure may take up to several hours and requires clamping and storage of the units during the cure period.

Hot melt double glazing sealant compositions based on butyl compounds are known. These sealant compositions are usually formulated with a view to providing a blend of properties, including ability for application as a heat softenable mass, good resistance to moisture vapor transmission and adhesion to glass and spacer materials. Although acceptable seals may be formed with such sealant compositions, many compositions based on butyl rubber have cohesive strength and adhesion to glass which is generally of a lower order than is the case with polysulphide or epoxy polysulphide sealants. Moreover, some components used to improve adhesive properties in the formulation of butyl based hot melt sealants, tend to provide seals which have poor resistance to flow when heated, or even at room temperature, or become unduly hard when cooled.

Various means of application of double glazing sealants have been proposed, for example devices which dispense quantities of metered and mixed polysulphides, and extrusion or gun devices for hot melts. As will be apparent, application of the sealants as fluids requires careful control if time consuming cleaning operations are to be avoided.

British Pat. No. 1,384,127 discloses multiple insulating glass units formed by use of sealant compositions based on thermoplastic rubber block copolymers of a specified type exemplified by styrene-butadiene-styrene and styrene-isoprene-styrene block copolymers. The specification indicates that the sealant may be employed as a coating on metal spacing sections for double glazing. However, sealants based on such block copolymers tend to have comparatively unacceptable adhesion characteristics for high quality double glazing, even when used in conjunction with a silane primer. Also, these sealants tend to demonstrate rather higher moisture vapor transmission than butyl based sealants.

It should be apparent from the above description that there is a need outstanding in the art for an efficient double glazing method using a hot melt sealant composition which can be employed in a simple fashion to provide a double glazing unit seal having good mechanical properties under a wide range of environmental conditions coupled with high resistance to moisture vapor transmission and good adhesion to the glass and spacers. This invention is directed to that need and provides an improved method for producing multi-pane glazing units and improved multi-pane glazing units so produced.

SUMMARY OF THE INVENTION

The novel improved method of this invention provides multi-pane units having seals of high quality. Essentially, the sealant composition is provided by two separate thermoplastic parts. One part comprises a heat softenable polymeric composition and a chemically curable compound. The other part comprises a heat softenable polymeric composition and a curing agent for the curable compound. According to this invention, the sealant composition providing the bond or seal between the assembly elements of the unit is provided by combining the separate parts at the time of assembly. This separation permits the application of one or the other or both parts to the assembly elements in the form of layers preferably as elastic, non-tacky, heat softenable thermoplastic layers. Accordingly in one embodiment of the invention the pane(s) may carry a layer comprising one part of the sealant composition while selected surfaces of the space frame may carry the other part. In this embodiment, the layers comprising the separate parts are brought into contact at the time of assembly of the elements. Sufficient heat and/or pressure are then applied to soften the layers and combine the separate parts so that the sealant composition can provide a bond between the layers carried by the panes and the layers carried by the separation frame.

In another embodiment, the panes and spacer frame both carry layers comprising the same part of the sealant composition. The panes and spacer frames are assembled so that the other part can be applied to the assembly to contact the layers carried by the panes and spacer frame. For example, pane and spacer frame elements each carrying layers comprising one part of the sealant composition can be assembled to provide a channel. The provided channel is defined by surface portions of the spacer frame carrying the layer and peripheral surface portions of the panes carrying the layer. Combination of the one and other part of the sealant composition is achieved by applying the other part to the channel as a hot melt so that the sealant composition provides a bond between the layers carried by the panes and the layers carried by the spacer frame.

DESCRIPTION OF PREFERRED EMBODIMENTS

A multi-part sealant composition useful in a method according to the invention preferably comprises two parts, the first part is applied in the form of a solution or dispersion to peripheral portions of the panes, and preferably also to surfaces of spacer elements of the spacer means, to provide a heat softenable layer thereon. The second part is employed as a mass, at least surface portions of which are heat softenable. When carrying out a process according to one mode of the invention, prepared panes and spacer elements (joined at their ends by clip elements) are assembled to provide a channel defined by surface portions of the spacer elements and peripheral surface portions of the panes. The second part of the composition is applied to the channel as a heat softened tape or as a hot melt mass in engagement with the first part of the composition previously applied to the surface portions providing the channel.

When carrying out a process according to the invention in another, more preferred, mode, the second part of the composition is applied to provide a coating on the spacer elements. These spacer elements are then assembled in a closed figure of appropriate shape and size, with end portions of the elements joined, e.g. by clip elements to provide the spacer means. The spacer means is then positioned or located in contact with peripheral surface portions of prepared panes carrying a coating or layer of the second part of the composition in engagement with the first part previously applied to the peripheral portions. Heat and pressure are then applied to combine the parts and to form the sealant composition which provides a seal bonding the panes to the spacer. The heat and pressure may be applied in any convenient manner; for example, infra red (e.g. 1 to 3 microns wave length) radiation may be directed through glass panels to soften the surface of the second part of the sealant on the spacer element, and the unit may be passed to a press set to compress the sealant to a pre-determined required extent. In this operation, short wave infra red radiation is preferred (e.g. 1 to 1.5 microns wave length) together with the use of a roller press.

Various heat softenable polymeric materials may be used in a sealant composition in a method according to the invention but block copolymer or mixtures thereof are definitely preferred. Particularly preferred are block copolymers (referred to as polystyrene-polyolefin rubber-polystyrene block copolymers) having two polystyrene end blocks linked to an at least substantially saturated polyolefin rubber midblock. These materials are selected in view of their thermal and oxidative stability, low moisture vapor transmission rate, their good mechanical properties especially at ambient temperature and application characteristics. It is believed that these materials may be described as containing at least two poly(alphamonoalkenyl arene) blocks and at least one elastomeric hydrogenated polyconjugated diene block, for example hydrogenated polybutadiene or hydrogenated polyisoprene. The poly(alpha-monoalkenyl arene) blocks may have an average molecular weight ranging from about 4,000 to about 50,000 or 150,000, preferably from about 7,000 to about 25,000 and most preferably from about 7,500 to about 10,000.

The alpha-monoalkenyl aromatic monomer may be styrene, alphamethylstyrene or alkyl ring substituted styrenes where the alkyl group contains 4 or less carbon atoms and there are 2 or less of these alkyl groups. The elastomeric poly(conjugated diene) block has an average molecular weight in the range of from 18,000 to about 250,000 or 500,000, preferably from 25,000 to about 100,000 and most preferably from about 27,000 to about 50,000. The poly(conjugated diene) block which is hydrogenated contains at least 20 percent, preferably at least 35 percent of the monomer units polymerized in the 1,2 configuration. Hydrogenation (saturation) of these poly(conjugated diene) blocks is carried out to a point where at least 95 percent of the double bonds are saturated, preferably at least 99 percent are saturated so that the midblock comprises an at least substantially saturated polyolefin rubber. Less than 10 percent of the aromatic double bonds of the poly(alpha-monoalkenyl arene) block are hydrogenated; preferably less than 2 percent are hydrogenated. Preferred materials are supplied by Shell Chemicals under the trade names KRATON G 1650 and KRATON G 1652, and are described as thermoplastic rubbers, the molecules of which include polystyrene end blocks (S) and incompatible polyolefin rubber midblocks (EB) to an extent of about 70 percent by weight. The polyolefin rubber midblocks are said to provide an ethylene-butylene rubber phase.

As mentioned, the sealant compositions used in the methods of the invention, employ a chemically reactive or chemically curable compound and a compound capable of curing the curable compound, e.g. a curing agent.

The chemically curable compound(s) and the curing agent(s) are used in the separate parts of the composition since the separation assures uniformly high quality adhesion between the spacer elements and glass. Various combinations of curable compounds may be employed, including compounds chosen from organic polymeric components containing one or more of the chemically reactive groups

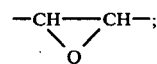

—OH; —NCO; —SH and —COOH.

The curing agent is one which will react with or catalyze reaction of the curable compound and may be a material containing one or more of the groups

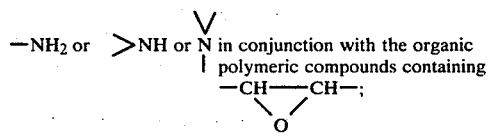

—COOH or —NCO in conjunction with organic polymeric compounds containing —OH or —SH; or
—OH or —NH$_2$ in conjunction with organic polymeric compounds containing —NCO or —COOH.

Of the curable compounds described above, a liquid epoxy resin is preferred and a liquid teritary amine active as a catalyst capable of curing the epoxy is preferred as the curing agent. This preferred curable compound - curing agent combination avoids problems associated with precise stoichiometric mixing of the two components.

Suitable reactive epoxy resins for use as the curable compound are liquids and include those having molecular weights less than 3,000 and epoxide equivalents of 180 to 210 (grams of resin containing one gram equivalent of epoxide). A preferred material is that supplied as EPIKOTE 828, which is derived from epichlorhydrin and diphenylolpropane, is liquid at room temperature, and has an epoxide equivalent of about 190, a viscosity at 25° C. (Gardner-Holdt) of 100 to 160 poise, more specifically about 125 poise, and an average molecular weight of 370. A preferred tertiary amine is 2.4.6 tris-dimethylaminomethylphenol. The ratio of the preferred curable compounds and curing agent employed in the separate parts of the composition is not especially critical, but their presence appears essential in order to achieve high quality adhesion to glass panels and metal spacer elements.

In a method according to the invention, the first part of the sealant composition preferably comprises a solvent-borne solution (e.g. a 20 percent by weight solution), of a thermoplastic material comprising a tertiary amine as discussed above, a heat reactive phenolic resin, and a block copolymer. The block copolymer is preferably a polystyrene-polyolefin rubber-polystyrene block copolymer as above referred to, a polystyrene-polybutadiene-polystyrene block copolymer or a polystyrene-polyisoprene-polystyrene block copolymer or a mixture thereof. In the preferred first parts, the block copolymer is used in sufficient quantities to ensure thermoplasticity of the first part material, and compatibility of this first part with the second part of the sealant composition. In order to achieve good tensile strength and elasticity of the final seal, the preferred amount of polystyrene-polyolefin rubber-polystyrene block copolymer used is an amount up to about 40 percent by weight of the first part of the composition. However, if the block copolymer is diluted with other block copolymers, amounts up to about 60 percent by weight of the mixed copolymer by weight of the first part may be used. The preferred first parts of the composition comprise from about 10 to about 30 parts by weight of the preferred block copolymer per hundred parts by weight of the first part material.

In the preferred first parts (or first part materials) the heat reactive phenolic resin is included in order to promote adhesion to glass, and may be any one or more of the commonly available heat reactive phenolic resins having a melting point (Ball & Ring) below 130° C. and being compatible with other components of the composition. The amount of heat reactive phenolic resin used is an amount sufficient to ensure adequate adhesion to glass, but the amount used may be limited by incompatibility with the components and possible brittleness of the applied film. Suitable amounts of heat reactive phenolic resins which may be used can vary from about 2 to about 40 parts by weight and more preferably from about 5 to about 20 parts by weight per hundred parts by weight of the first part material. The amount of tertiary amine used is not especially critical. However, the amount of tertiary amine used in the preferred first parts is chosen in appropriate proportion to the amount of epoxy resin employed in the second part of the composition and also so as to ensure that the final seal is not unduly weakened by presence of liquid amine. Suitable amounts of tertiary amine can vary from about 0.25 to about 20 parts by weight; particularly preferred are amounts from about 1 to about 7 parts by weight of the tertiary amine per hundred parts by weight of the first part materials.

In a preferred method of the invention, the first part of the composition is applied to edge portions of glass panels and to the spacer elements to provide a thin film of heat softenable, thermoplastic, material adherent to the glass or to the spacer. The first part may be applied to the glass in various ways but preferably the first part is applied as a solution in volatile organic solvent(s). Suitable solvents are those which wet glass readily, and evaporate readily to leave a uniform thin layer or film of material, for example not more than 0.5 mm. thick, and preferably not more than 0.05 mm. thick.

Additional resins are preferably included in the first part to ensure that the applied layer of film is heat softenable to a tacky condition by heat from or heating of the second part of the composition. Such additional resins include, for example, a tackifying resin such as an aliphatic hydrocarbon resin of melting point (Ring & Ball) of 60° C. to 150° C., e.g. ESCOREZ 5280, 5300, 5310 or 5320, EASTOREZ 100, QUINTONE B 170, or an alicyclic resin having a melting point (Ring & Ball) of 60° C. to 150° C. The resin may be used in quantities up to 80 parts by weight per 100 parts by weight of the first part. However, while large quantities of the resin lead to first parts of lower melt viscosity having improved tack at higher temperatures and good green strength of bonds to glass, excessive amounts of such resins may lead to unwanted brittleness of the applied layer. Particularly preferred resins are the aliphatic hydrocarbon resin in amounts between about 20 to about 40 parts by weight per hundred parts by weight of the first part. Also, the first part may include up to about 80 parts by weight per hundred parts by weight of the first part of an aromatic hydrocarbon resin having a melting point (Ring & Ball) of 50° C. to 150° C., e.g. PICCOTEX LC 120, ($\alpha$-methyl styrene/vinyl toluene), Amoco Resin 18 ($\alpha$-methyl styrene), PICCOVAR 130 (alkyl aromatic hydrocarbon). This aromatic hydrocarbon resin also contributes to lower melt viscosity and hot tackiness of the first part layer, and also contributes to cohesive properties of the layer. However, larger amounts tend to lead to harder, more brittle layers or films. Preferred amounts of aromatic hydrocarbon resins are those which are less than 40 parts by weight of the resin per hundred parts by weight of the first part materials. Other resins which may be included in the first part materials are polyterpene resins (e.g. NIREZ 1115, ZONAREZ B115, PICCOLYTE) and/or hydrogenated rosin esters (e.g. FORAL 85 or 105, STAYBELITE Ester 10).

Where tacky layers are required, appropriate additional resins may be included. Other known adhesion promoters, resins and rubbers may also be included, for example silane, post-chlorinated polyvinyl chloride terpolymers of vinyl chloridevinyl acetate and maleic acid, but these are not preferred. Stabilizers or antioxidants are also included, for example benzotriazole derivatives, polymeric hindered phenols, zinc-dibutyl-dithiocarbonate, pentaery-thritol-tetra-kis [3-(3,5-diterbutyl-4-hydroxyphenyl)-].

Pigments may be included in first parts of sealant composition and this may be desirable where for example, infra red heating of the composition is to be carried out.

The materials or components of the first parts of the composition are chosen so as to provide a thermoplastic layer firmly adherent to the panels (and spacer when used thereon) and which is compatible with and may become adherent to the second part of the composition, and has a softening point (Ring & Ball) in the range 50° C. to 190° C., and preferably in the range 80° C. to 150° C.

In a method according to the invention, the second part of the composition is preferably applied to the unit in the form of a heat softenable layer or coating pre-applied to the spacer means or as a hot melt, and the various materials or components are selected with a view to required application and performance characteristics. The second part of the composition preferably comprises an epoxy resin, a polystyrene-polyolefin rubberpolystyrene block copolymer and an aliphatic hydrocarbon resin having a melting point (Ball & Ring) 60° C. to 150° C. as tackifying resin. The block copolymer may be employed in quantities from 5 to 50 parts per hundred parts by weight of the second part materials but particularly desirable cohesive strength, elasticity and moisture vapor transmission properties are achieved with as little as 9 to 30 parts by weight per 100 parts by weight of the second part.

The hydrocarbon resin is required as a tackifying resin conferring required hot tack properties to the heat softened composition, and also serves as a melt viscosity modifier at lower temperatures. It is important, however, especially in those cases where the composition is to be employed as a heat softenable coating on spacer elements, that the quantity of resin used should not confer tackiness on the composition at ambient temperatures of storage and transit (i.e. up to about 50° C., more normally 0° C. to 35° C.). Greater quantities of the aliphatic resin tend to lead to desirably low melt viscosity and wetting characteristics and also to poorer low temperature properties of the final seal, i.e. to hardness and brittleness of the seal, which may manifest itself in breakage of the sealed panels and in other ways. Correspondingly, smaller quantities of the resin tend to render the second part more difficult to apply and to difficulties of wetting-out of the melt. Preferred amounts of hydrocarbon resins are from about 5 to 50 parts by weight and more preferably from about 12 to about 30 parts by weight per 100 parts by weight of the second part.

The amount of epoxy resin included in the second part of the composition can vary. Larger amounts of epoxy resin appear to promote faster adhesion but, the amount of epoxy resin employed is limited by compatibility of the resin with other components of the second part. Amounts of from about 2 to about 40 parts by weight are generally acceptable, but in order to avoid compatibility difficulties, and assure fast build up of adhesion to a desirably high value, the preferred amounts of epoxy resin are those between about 5 to about 15 parts by weight epoxy resin per 100 parts by weight of the second part. The preferred epoxy resin mentioned before also serves to some extent as a plasticizer for the second part of the composition.

If desired, up to 50 parts by weight of an aromatic hydrocarbon resin having a melting point (Ball & Ring) of 60° C. to 130° C. may be included per 100 parts by weight of the second part. Excessively large quantities of aromatic resin tend to promote undesirable hardness in the final seal, but certain amounts of this resin contribute to desirable low melt viscosity, high cohesion and hot tack of the second part. Also, the cold composition is likely to have very little tackiness of normal temperatures of transport and storage. Preferred second parts of sealant compositions comprise no more than about 20 parts by weight of aromatic resin per 100 parts by weight of the second part.

Second parts of sealant compositions used in the methods of this invention may include 40 parts by weight per 100 parts by weight of the second part of a liquid polybutene having a molecular weight less than 10,000. The liquid polybutene is preferably included to function as a low temperature plasticizer for the composition and final seal, and also to contribute to rubbery characteristics of the seal and to reduce melt viscosity of the second part. Preferred amounts of polybutene are from about 10 to about 30 parts by weight polybutene per 100 parts by weight of the second part. The second part may also comprise a wax to improve the non-tacky nature of the second part at ambient temperatures of storage and transit. For example, the second part may comprise up to about 15 parts by weight, more preferably up to about 10 parts by weight, (per 100 parts by weight of the second part), of a wax with a melting point (Ball & Ring) from 50° C. to 120° C., for example a paraffin wax of melting point 100° C. Other resins, for example polyethylene, atactic polypropylene, ethylene vinyl acetate, and polyisobutylene and additives for example, finely divided inorganic filler, pigments, e.g. carbon black and stabilizers may be included, as extenders, fillers and hot tackifiers if desired. It is desirable to include some filler in order to promote handling of the melted second part and in the preferred compositions substantial amounts of fillers are included, i.e. up to about 60, or even about 80, parts by weight per 100 parts by weight of the second part. Also, where the second part is to be heated by infra red radiation it is desirable to include up to about 15, more preferably up to about 8 parts by weight carbon black per 100 parts by weight of the second part.

The preferred blend of materials or components of the second part provides a second part which is non-tacky at temperatures up to 50° C., storage stable (as to shape and composition) for lengthy periods at ambient temperatures of storage and transit, and capable of being melted and held molten at 140° C. to 150° C. for several hours without deleterious effects, for application as a hot melt at 150° C. to 190° C.

Spacer means employed in a method according to the invention preferably comprises spacer elements which are hollow, to accept dessicant, and perforated or slit on that surface intended to be exposed to the inside of the unit. Preferably the spacer elements are of metal e.g. aluminum or steel and are also somewhat resilient to permit relative movement of approach between panels spaced apart thereby. Various cross-sectional designs of spacer element may be employed, but preferred designs are those provided that the surfaces intended to abut inner surfaces of the panels are substantially parallel and uniform so that a satisfactory disposition may be secured in the final unit.

In a preferred mode of carrying out a process according to the invention, surfaces of metal profiles which are to provide part of the spacer means are treated with a first part of the composition to provide a thin heat softenable layer on those surfaces intended to be coated with the second part of the composition. The second part of the composition is then applied as a hot melt at 150° C. to 190° C. onto the layer to provide a layer at least 0.1 mm thick, providing a uniform profile of desired external geometry. With the preferred composition, the layers harden on cooling to a tough, elastic, non-tacky condition, so that after the layer has cooled, the spacer member so formed is capable of transit and storage without use of any special coating or interleaving layers. In order to prepare a multi-panel or double glazing unit, the spacer members are sawed into required lengths for assembly as spacer means between the panels, and the lengths joined together in a suitable fashion.

The several embodiments of the invention will be better understood and appreciated from the following description taken in connection with the drawings and the Examples are presented to illustrate manners of making and using the invention rather than imposing any limitations on the invention defined in the appended claims.

DESCRIPTION OF THE DRAWINGS

FIGS. 1-7 are each a diagrammatic view of a spacer element useful in the practice of the present invention;

FIG. 8 is a diagrammatic view of a corner joint between spacer elements;

FIG. 9 is a diagrammatic view of a device employed in preparing spacer means for use in the practice of the present invention;

FIGS. 10 and 11 are each a diagrammatic view of other corner joints between spacer elements;

FIG. 12 is a diagrammatic view of another spacer element;

FIGS. 13 and 14 are each a diagrammatic view of other corner joints between spacer elements;

FIG. 15 is a diagrammatic view of means for applying a first part of the composition to glass panels;

FIG. 16 is a diagrammatic view of means for applying heat and pressure in the production of double glazing units; and FIG. 17 is an exploded diagrammatic view of a corner joint between spacer elements.

Various examples sealant compositions were prepared comprising first and second parts containing components in the amounts by weight shown in Tables I and II. The following Examples demonstrate the various properties of the example compositions.

EXAMPLE I

In this example, the adhesion of sealant compositions employing example second part 1 (referred to in Table I) with and without first parts of the composition was examined. In this example, triplicate sets of sample glass to aluminium bonds were formed with the sealant, there being a thickness of 15 mm of hardened seal between the glass pane and the aluminium, and glass to seal and aluminium to seal contact areas of 50 mm by 15 mm. To form the samples, a 15 mm wide cleaned glass plate and a 15 mm wide cleaned aluminium profile were held spaced apart by 15 mm, to define a 50 mm long space between them, and then the sealant composition was injected into the space between them as a hot melt to completely fill the space or channel. In each case this sealant flowed well into the channel and formed an elastic seal at least lightly adherent to the glass plate and spacer. For a first set of samples, prior to assembling the samples, no pre-treatment of the glass plates or spacers was performed; for a second set of samples, after application of the sealant, (i.e. "second part 1" alone) the samples were maintained for one hour at 180° C.; for a third set of samples, the peripheral portions of the glass plates were treated (prior to assembling the samples) with "first part 4" (Table I) applied by wiping a thin film of the solution on to the glass plates with a sponge, and allowing the solvent to evaporate; for a fourth set of samples prior to assembling the samples, peripheral surface portions of the glass plates were treated with "first part 1" (Table I) applied by wiping a thin film of the solution onto the glass plates with a sponge, and allowing the solvent to evaporate.

After the sealant had cooled to room temperature, two groups of samples were aged in different ways. One group of samples comprising triplicates of each of the first, second, third and fourth sets of samples was aged for two days at 23° C., 50% relative humidity. A second group of samples comprising triplicates of each of the first, second, third and fourth sets of samples was aged for twenty one days under exposure to ultraviolet light and warm water. In this aging procedure, the samples were immersed in the water with an upper sealant to glass interface coplanar with the surface of the water, and with a 275 watt UV lamp spaced 35 cm from and directed towards the upper surface of the glass plate. This group of samples were subjected to a tensile test according to DIN 52 455 in which the samples were pulled apart at 6 mm per minute.

The maximum load, maximum elongation, and type of adhesive failure were examined for each group of samples. The mean results for each triplicate set of samples are shown in Table III.

TABLE I

First Part of Composition

| Component | Example First Part of Composition | | | | | |
|---|---|---|---|---|---|---|
| | 1 | 2 | 3 | 4 | 5 | 6 |
| Block copolymer (1) | 98% by weight of a first part of composition according to Example 4 together with 2.0 | 20.0 | 24.5 | | 23.2 | 23.1 |
| Block copolymer (2) | | | | 25.0 | | |
| Hydrocarbon resin (aliphatic) | | 32.5 | 30.7 | 37.0 | 37.7 | 37.1 |
| Tertiary amine | | 3.5 | 3.0 | 0 | 0 | 0 |
| Heat reactive phenolic resin | | 10.0 | 10.0 | 0 | 0 | 0 |
| Hydrocarbon resin (aromatic) | | 32.5 | 30.7 | 37.0 | 37.6 | 37.3 |
| Stabilizer 1 | | 1.0 | | | 1.0 | 1.0 |
| Stabilizer 2 | | | 0.6 | 0.5 | | |
| Stabilizer 3 | | 0.5 | 0.5 | 0.5 | 0.5 | 0.5 |
| Silane | | | | | | 1.0 |
| Total: | 100.0 | 100.0 | 100.0 | 100.0 | 100.0 | 100.0 |
| Toluene | 400.0 | 150.0 | 150.0 | 400.0 | 400.0 | 400.0 |

TABLE II

Second Part of Composition

| Component | Example Second Part of Composition | | | | | | | |
|---|---|---|---|---|---|---|---|---|
| | 1 | 2 | 3 | 4 | 5 | 6 | 7 | 8 |
| Block copolymer (1) | 18.5 | 9.1 | 16.0 | 27.3 | 16.0 | | 14.1 | 14.7 |

TABLE II-continued

| | Second Part of Composition | | | | | | | |
|---|---|---|---|---|---|---|---|---|
| | Example Second Part of Composition | | | | | | | |
| Component | 1 | 2 | 3 | 4 | 5 | 6 | 7 | 8 |
| Block copolymer (2) | | | | | | 27.3 | | |
| Hydrocarbon resin (aliphatic) | 27.5 | 14.6 | 18.0 | 22.2 | 21.5 | 31.8 | 19.7 | 17.9 |
| Epoxy resin | 7.8 | 7.3 | 7.5 | 8.5 | 0 | | 13.7 | 8.1 |
| Polybutene I | 18.5 | 24.5 | 18.0 | 13.7 | 22.0 | | 16.4 | 19.6 |
| Polybutene II | | | | | | 13.7 | | |
| Hydrocarbon resin (aromatic) | 5.5 | | | | | | 8.1 | 3.6 |
| Finely divided calcium carbonate | 14.2 | 41.0 | 35.5 | 25.3 | 35.5 | 27.2 | 14.4 | 20.8 |
| Carbon black | 8.0 | 0.8 | 1.0 | 1.0 | 1.0 | | | 2.5 |
| Titanium pigment | | | | | | | 1.9 | 3.0 |
| Paraffin wax 1 | 2.7[1] | | | | | | | |
| Zinc oxide | | | | | | | 3.0 | 2.9 |
| Paraffin wax 2 | | | 3.5 | 2.0 | 3.5 | | | |
| Paraffin wax 3 (MPI130) | | | | | | | | 2.1 |
| Stabilizer 1 | | | 0.5 | | 0.5 | | | |
| Polyethylene | | | | | | | 7.2 | 4.8 |
| Flatting | | | | | | | 1.5 | |
| Total: | 100.0 | 100.0 | 100.0 | 100.0 | 100.0 | 100.0 | 100.0 | 100.0 |
| MVTR (38° C.) 90% RH | 0.35 | 0.2 | 0.3 | 0.5 | 0.2 | 0.15 | 0.5 | 0.3 |

In Tables I and II, the various materials used are identified as follows:

Block copolymer 1 was KRATON G 1652, which is understood to be a polystyrene-saturated polyolefine-polystyrene block copolymer (S-EB-S), in which the polyolefin rubber provides about 70% by weight of the copolymer, having a specific gravity of 0.91, a solution viscosity of 150 cps at 15% solids in Toluene and 2,500 at 25% solids in Toluene, tensile at break of 6500 psi, elongation at break of 500%, a 100% modulus of 730 psi, and a Shore A hardness of 75.

Block Copolymer 2 was KRATON G 1650, which is understood to be a S-EB-S block copolymer material similar to KRATON G 1652 but of higher molecular weight and higher viscosity namely a solution viscosity of 350 cps at 15% solids and 8500 at 25% solids, tensile at break of 6000 psi, elongation at break of 500% and a 100% modulus of 950 psi.

The hydrocarbon resin (aliphatic nature) was ES-COREZ 5310, which is believed to be a hydrogenated polycyclopentadiene resin.

The tertiary amine was DMP 30 which is believed to be 2,4,6-Trisdimethylaminomethyl phenol.

The heat reactive phenolic resin was SCHENNECTADY SP 1045.

The hydrocarbon resin (aromatic nature) was PICCOTEX LC which is believed to be a styrene resin, having a melting point of about 90° C.

Stabilizer 1 was pentaerythrityl-tetraKis-[3-(3,5-di-tert. butyl-4-hydroxyphenyl)-propionate].

Stabilizer 2 was a polymeric hindered phenol.

Stabilizer 3 was a benzotriazole derivative.

The silane was SILANE Z6020 which is believed to be predominantly $NH_2$—$CH_2$—$CH_2$—NH—$(CH_2)_3$—$Si(OCH_3)_3$.

The epoxy resin used was EPIKOTE 828 which is believed to be derived from epichlorhydrin and diphenylol-propane, had an epoxide equivalent of about 190, a viscosity at 25° C. of 100 to 600 poise, and an average molecular weight of 370.

Polybutene I used was INDOPOL H300 which is believed to have a mean molecular weight of 1220.

Polybutene II used was Indopol INDOPOL which is believed to have a mean molecular weight of 3000.

Paraffin wax 1 was paraffin 10805 which is believed to be a fully refined paraffin of melting point 56° C. to 58° C.

Paraffin wax 2 was Texaco Wax HP104 which is believed to be a hard paraffin of melting point 94° C. to 98° C.

Paraffin wax 3 used was TEXWAX MP130, which is believed to be paraffin wax having a melting point of 65° C. to 70° C.

The polyethylene used was ALKATHENE 15023 which is believed to be a low molecular weight polyethylene having a Vicat softenint point 65° C.

The flattening agent used was OK412 which is supplied by DeGussa as a flattening agent.

The moisture vapor transmission rate (MVTR) values are recorded in $g/m^2/day$ and were determined at 38° C., 90% relative humidity according to DIN 53122.

TABLE III

| | Test Results - Example I | | | |
|---|---|---|---|---|
| Sample Set | First | Second | Third | Fourth |
| First Part (TABLE I) | — | — | 4 | 1 |
| Second Part (TABLE II) | 1 | 1 | 1 | 1 |
| First Group | | | | |
| Maximum load | 1.9Kp/cm$^2$ | 2.6Kp/cm$^2$ | 8.3Kp/cm$^2$ | 10.6Kp/cm$^2$ |
| Maximum elongation | <50% | <50% | 280% | 400% |
| Type of failure | A | A | A | C |
| Second Group | | | | |
| Maximum load | 1.7Kp/cm$^2$ | 1.7Kp/cm$^2$ | 2.5Kp/cm$^2$ | 9.2Kp/cm$^2$ |
| Maximum elongation | <50% | <50% | <50% | 350% |
| Type of failure | A | A | A | C |

Type of failure A indicates adhesive failure between glass and sealant.
Type of failure C indicates cohesive failure of the sealant.

The results shown in Table III indicate that a low quality adhesive bond is achieved in the absence of pretreatment of the glass plates. Although initial adhesion can be improved by heat treatment of the samples, exposure of the second set of samples to the test of the second group yields values the same as those achieved with the first set where no heat treatment of the sample was employed. Provision of the thermoplastic layer from the first part 4 (Table I) as a pretreatment yields seals of much improved adhesive strength and elongation under the test conditions of the first group, but these values are much reduced on exposure of the third set of samples to the second group test. Provision of the thermoplastic layer from the first part 1 (Table I) as a pretreatment yields seals of further improved adhesive strength and elongation under the test conditions of both the first and second groups. Indeed, the results show that cohesive failure of the seal occurred in preference to failure of the sealant to glass adhesive bond, thus allowing opportunity to take fuller advantage of the elongation properties of the sealant.

EXAMPLE II

In this example the adhesion was examined of sealant compositions employing example second parts 3, 4 and 5 (see Table II) with and without first parts 2, 5 or 6 (Table I) of the composition. A set of sample bonds of a commercially available butyl rubber based hot melt double glazing sealant (the sixth set) was also tested for comparative purposes. Sets of samples of glass to aluminium bonds were made by providing a thin layer of the first part of the composition (if used) on a cleaned glass plate 40 mm wide, placing two "stops" 2 mm thick adjacent ends of the plate, placing on the plate between the stops a foil of the second part of the composition 4 mm thick by 25 mm wide, and placing on the foil an aluminium strip 40 mm wide having a thin layer of the first part of the composition (if used). The assembly was heated to 180° C. for 30 seconds and subjected to 1 Kp pressure so that the final thickness of the sealant layer was 2 mm. Sealant extruded from the test piece was stripped off and the sample allowed to cool to room temperature. Example first and second parts were used as shown in Table IV to prepare sets of sample bonds; in preparing the fourth, fifth and sixth sets of sample bonds no treatment of the glass was effected prior to application of the hot melt. Four groups of samples were aged in the following way. First and second groups were aged as the first and second groups respectively described in Example I. The third group was aged for two weeks at 70° C. The fourth group was aged (using a Xenotest 150 device) for two weeks at 65% relative humidity at about 35° C.; during this time at 25 minute intervals the samples were subjected to a water spray for 5 minutes, and the samples were continuously exposed to radiation of a spectral energy distribution similar to that of the sun through a series of filters. The sample sets, after ageing, were subjected to a peel test according to U.S.A. specification TT-S-00230C(COM-NBS) (180° peel angle, speed 50 mm/min., width of sample 40 mm) to determine the force required to peel apart the sample and to determine the mode of failure. Tests were carried out on samples from each of the six sample sets in the first group. It is observed that the force required to peel the first sample set in the first group is far in excess of that required for the others in this group, and that the adhesion is sufficiently good to permit cohesive failure. It is noted that high peel values and cohesive nature of the failure are repeated in the second, third and fourth group tests for the first sample set.

TABLE IV

| Sample Set | Peel Test Results - Example 4 | | | | | |
|---|---|---|---|---|---|---|
| | First | Second | Third | Fourth | Fifth | Sixth |
| First part (Table I) | 2 | 5 | 6 | — | — | — |
| Second part (Table II) | 3 | 5 | 5 | 3 | 4 | comp. |
| First Group | | | | | | |
| Force in Kp/4cm | 85 | 0 | 33 | 7 | 21 | 6 |
| Failure | C | A | C/A | A | A | C |
| Second Group | | | | | | |
| Force in Kp/4cm | 70 | | | | | 5 |
| Failure | C | | | | | C |
| Third Group | | | | | | |
| Force in Kp/4cm | 85 | 20 | | | | |
| Failure | C | A | | | | |
| Fourth Group | | | | | | |
| Force in Kp/4cm | 90 | | | | | 6 |
| Failure | C | | | | | C |

C = Cohesive failure
A = Adhesive failure

Spacer elements suitable for use in providing spacer means for use in methods according to the invention are shown diagrammatically in FIGS. 1 to 7 and 17 of the drawings. The spacer elements shown in FIGS. 1 to 6 each comprise a hollow metal profile (10, 11, 12, 13, 14, 15) portions of which abut and hook over each other (18, 19, 20, 21, 22, 23) to provide an air permeable joint permitting slight compression or expansion of the spacer element in a widthwise direction. In use, the joints 18 to 23 are disposed towards the inside of the unit. The metal profiles 10 and 11 are substantially rectangular in section, the metal profiles 12 and 13 are substantially "T" shaped in section, and the metal profiles 14 and 15 are substantially "I" shaped. Each of these spacer elements has a coating of sealant composition (26, 27, 28, 29, 30, 31) on side surfaces (34, 35, 36, 37, 38, 39) of the profile. In the spacer elements of FIGS. 1, 3 and 5 the coating of sealant also covers outer surfaces (90, 93, 95) of the profiles.

These spacer elements are made by first applying to the metal profile a thermoplastic coating of a first part of the sealant composition. For this purpose, any of the example first parts 1, 2 and 3 listed in Table I may be used, but in preparing these six spacer elements first part 3 was used. This solution was applied to leave, after evaporation of the solvent, a coating less than about 0.1 mm thick. After evaporation of the solvent, a second part of the sealant composition is applied. For this purpose, any of the example second parts 1, 2, 3, 4, 7 and 8 listed in Table II may be used, but in preparing these six spacer elements second part 2 was used. The second part was applied as a hot melt at 180° C. by an extrusion process so that a coating of required shape and thickness was applied, to form a spacer element of uniform geometry throughout its length. Preferably, the coatings on the side surfaces (34 to 39) are slightly convex so as to minimize the possibility of entrapment of air between the spacer elements and the panels when the spacer elements are used. After cooling, the sealant mass was highly elastic and non-tacky and the spacer elements could be stored and transported in bundles without recourse to special interleaving papers or the like.

In FIG. 7 there is shown a spacer element suitable for use in production of triple pane glazing units. It comprises a hollow metal profile 16 having a re-entrant slot 17 for accepting a glass pane, and has perforations 24 along surfaces intended to face towards the inner air spaces of the unit. A coating 32 of a second part of the sealant composition is provided on parallel side surfaces 33 of the profile and also on an outer surface of the profile. A deposit 34 of pressure sensitive adhesive is located in the slot 17 whereby the glass pane may be secured in place.

In carrying out a first illustrative method to produce a rectangular double glazing unit, spacer means was prepared from four sections of the spacer element of FIG. 3 (although it will be understood that any of the spacer elements of FIGS. 1 to 6 may be employed) which were cut to a desired length and contained dessicant, and were connected at their ends by clip elements in the form of corner pieces (46) (FIGS. 8 and 9) frictionally gripped within the spacer elements. End portions of the spacer elements are cut with their end surfaces 40 perpendicular to the length of the spacer element (see FIGS. 8 and 9), so as to provide a void 41 at each corner of the unit. End portions of the spacer elements were heated for a few seconds by infra red radiation to soften the second part of the composition on the spacers. A corner mould 42 was fitted to each corner of the assembled spacers. As shown in FIG. 9, this mold fits closely to the profile of the joined spacer elements and assists to define the rectangular void 41. The mold has an injection port 43 through which a second part of the composition of the same formulation as that used for the spacer elements is injected as a hot melt to fill the void 41. The sealant is allowed to cool, and the mold is removed.

Two identical glass panes 45 were washed and cleaned. Peripheral portions of each pane were then provided with a thin thermoplastic layer of a first part of the sealant composition. For this purpose, any of the example first parts 1, 2, 3 listed in Table I may be used, but in the illustrative method, first part 3 was used. These layers were applied by progressing the panes on rollers so that their peripheral portions passed beneath an applicator 52 (FIG. 15) containing the first part 3 which is in the form of a solution. A felt pad 54 transmits a required thickness of the solution to the peripheral portions of the glass pane.

After evaporation of the solvent from the first part 3, one of the panes was laid on a horizontal table, and the spacer means was located on the peripheral portions of the pane. The spacer means was fitted to the glass pane so that the periphery of the pane coated with the first part 3 was overlaid by the sealant composition of the spacer elements.

The second glass pane was assembled on top of the spacer means, with its coated peripheral portions in contact with the second part of the sealant composition on the spacer elements. This assembly was then passed to a heating and pressing device (FIG. 16) comprising upper and lower banks of infra red heaters 62, 64 situated above and below a plane of passage of the units, the construction and arrangement being such as to deliver, at the interfaces, between the glass and first part, and the first part and second part, sufficient heat to heat the composition to a temperature higher than the softening points of the first and second parts of the composition so as to soften at least surface portions thereof. Each edge of the unit was passed in turn between the heaters 62, 64 and the assembly was immediately passed between rollers 66, 68 set to compress the unit by about 1 mm to a required total thickness. The double glazing unit so produced was then allowed to cool and was then ready for installation.

Although in our preferred method a particular corner costruction has been described, it will be appreciated that one may employ other corner constructions for the spacer elements. For example, one may employ spacer means formed by joining together, by means of corner connectors as shown in FIGS. 8 and 9, end portions of the spacer elements which are mitred so as to fit together as shown in FIG. 13, with the sealant layers of adjacent ends 56 in full engagement with each other at both sides of the joint. Alternatively, one may employ spacer means in which the voids 41 are filled by use of a cubic corner piece 60 (FIG. 14) of appropriate size, comprising a metal frame coated with a chosen second part of the composition. Alternatively, an arrangement may be employed as shown in FIG. 10, in which a close fitting corner sheath 80 is placed over the end portions of the assembled spacer elements during assembly of the spacer means. The corner sheath 80 comprises triangular side portions 81 of a second part of the composition, and rectangular web portions 82 integral therewith formed from the second part of the seal composition and reinforced with aluminium foil 83. Alternatively, an arrangement may be employed, as shown in FIG. 11, in which a close fitting corner connector 85 is inserted into end portions of the spacer elements during assembly of the spacer means. The corner connector comprises portions 86 having an external cross-section similar to the internal cross-section of the spacer elements, and an integral portion 87 coated with layers of a second part of the sealant composition for engagement with the panes. Alternatively, the spacer means may comprise linear spacer elements 88 joined to corner spacer elements 89 as shown in FIG. 12. In this arrangement, the corner spacer elements 89 are of the same construction and external cross-section as the linear spacer elements 88, and are linked and secured thereto by use of U shaped portions 90 of a second part of the composition which melt and flow to fuse with the layers of sealant on the spacer elements during heating of the unit to form the seal. Alternatively, one may complete the corner construction after the second pane is placed onto the spacer means. In such a procedure, any voids remaining at corners of the unit are sealed by gun application of the second part of the sealant as a hot melt from a manual dispensing gun.

In carrying out a second illustrative method, two identical glass panes were cleaned and their peripheral portions coated with the first part of the composition as in the first illustrative method. Metal spacer elements profiles 70 (FIG. 17) of appropriate length were provided with dessicant and joined at their corners by connector pieces 46 to provide spacer means as a closed figure of outer dimensions marginally less than dimensions of the glass panes. End portions 72 of the spacer elements 70 were crimped onto the connectors 46. Outer surfaces 73 of the spacer elements, extending from a shoulder 74 on one side of the element to a shoulder 74 on the other side of the element, were coated with a layer of the first part 3 described above, and the solvent allowed to evaporate. The spacer means and glass panes were assembled, with the panes and spacer means in register and with shoulder portions 74 of the spacer elements in contact with the glass panes, so as to provide a channel defined by the surface portions 73 of the spacer elements (extending from shoulder 74 to shoulder 74) and the coated peripheral surface portions of the panes. Second part 2 of the composition as referred to above was injected under pressure as a hot melt at 180° C. to the channel entirely around the circumference of the unit, and smoothed to provide a neat appearance. The double glazing unit so produced was allowed to cool and was then ready for installation.

What we claim is:

1. A method for sealing a multi glass pane unit using separate parts of a hot melt sealant composition, one part comprising a heat softenable polymeric composition and a chemically curable compound and the other part comprising a heat softenable polymeric composition and a curing agent for the curable compound, said method comprising the steps of:
    (a) providing two glass panes each carrying a layer comprising a part of the sealant composition on selected portions of at least one surface of each pane
    (b) providing a spacer frame with at least one selected surface carrying a layer comprising a part of the sealant composition, said spacer frame being of substantially uniform thickness and having a shape and size corresponding to the peripheral portions of at least one of said panes;
    (c) assembling said unit by positioning said spacer frame between the panes and bringing the separate parts of the sealant composition into contact with each other so that the separate parts can be combined to provide said sealant composition for sealing between the layer carried by each pane and a layer carried by said selected surface(s) of the spacer frame and
    (d) applying sufficient heat to soften said layers so that said separate parts can be combined to provide said seal.

2. A method of claim 1 where a layer carried by each pane comprises the part of the sealant composition containing the curing agent.

3. A method of claim 1 where a layer carried by the spacer surface(s) comprises the part of the sealant composition containing the curing agent.

4. A method of claim 1 where a layer carried by the spacer surface(s) comprises the part of the sealant composition containing the curable compound.

5. A method of claim 1 where a layer carried by the spacer surface(s) comprises a part of the sealant composition containing the curable compound and a layer comprising the part containing the curing agent is positioned between the spacer frame surface and the layer containing the curable compound.

6. A method of claim 1 where a layer carried by each pane comprises the part of the sealant composition containing the curing agent and a layer carried by the spacer surface(s) comprises part of the sealant composition containing the curable compound and the spacer is positioned between the panes so that the layers containing the separate parts are in contact with each other.

7. A method of claim 1 where the panes and spacer frame are assembled to provide a channel defined by surface portions of the spacer frame carrying a layer comprising the part of the sealant composition containing the curing agent and peripheral surface portions of the panes also carrying a layer comprising the part containing the curing agent and the part containing the curable compound is applied to the channel as a hot melt adhesive for comnbination with the part carried by the layers on the panes and the frame.

8. A method of claim 1 where heat is applied to the layers by means of a short wave infra red radiation directed through the panes.

9. A method of claim 1 where pressure is applied to the unit by passing the assembled panes and spacer frame through a roller press arranged to compress the unit to a desired thickness.

10. A method of claim 1 where a part of the sealant composition is applied to a selected surface(s) of the spacer frame in the form of a solution or dispersion.

11. A method of claim 10 where the part applied to the surface(s) is the part containing the curing agent.

12. A method of claim 1 where a part of the sealant composition is applied to peripheral portions of the panes in the form of a solution or dispersion.

13. A method of claim 12 where the part applied to the peripheral portions is the part containing the curing agent.

14. A method of claim 1 where the layers carried by the panes comprise the part containing the curing agent and the layer comprises a polymeric composition having a softening point between about 50° C. to about 190° C.

15. A method of claim 1 where the layer carried by the spacer surface(s) comprises the part containing the curable compound and the layer comprises a polymeric composition which is non-tacky up to about 50° C. and can be applied as a hot melt at temperatures between about 150° C. to about 190° C.

16. A method of claim 1 where the curable compound is a compound containing one of the chemically reactive groups

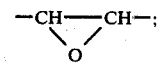

17. A method of claim 14 where the chemically reactive component is an epoxy resin, and the curing agent is a tertiary amine.

18. A method of claim 1 where the layers of heat softenable polymeric composition comprise a block copolymer having two polystyrene end blocks linked to a substantially saturated polyolefin rubber midblock.

19. A method of claim 1 where the layers carried by the panes comprise a tertiary amine and a polymeric composition having a softening point between about 50° C. to about 190° C. and the polymeric composition comprises a block copolymer having two polystryene end blocks linked to a substantially saturated polyolefin rubber midblock, a heat reactive phenolic resin and a tackifying resin.

20. A method of claim 1 where the layers carried by the panes and a layer(s) carried by the spacer surface(s) comprise a tertiary amine and a polymeric composition having a softening point between about 50° C. to about 190° C. and the polymeric composition comprises a block copolymer having two polystyrene end blocks linked to a substantially saturated polyolefin rubber midblock, a heat reactive phenolic resin and a tackifying resin.

21. A method of claim 20 where the panes and spacer frame are assembled to provide a channel defined by layer carrying surface portion(s) of the spacer and peripheral portions of the panes and a hot melt adhesive is applied to the channel at a temperature between about 150° C. to about 190° C. and the hot melt adhesive comprises a block copolymer having two polystyrene end blocks linked to a substantially saturated polyolefin rubber midblock, a tackifying resin and a liquid polybutene having a molecular weight of about 10,000 or less.

22. A method of claim 1 where a layer(s) carried by the spacer surface(s) comprise an epoxy resin, and a polymeric composition which is non-tacky at temperatures up to about 50° C. and can be applied as a hot melt at temperatures between about 150° C. to about 190° C. and comprises a block copolymer having two polystyrene end blocks linked to a substantially saturated polyolefin rubber midblock, a tackifying resin and a liquid polybutene having a molecular weight of about 10,000 or less.

23. A method of claim 20 where a layer(s) carried by the spacer surface(s) comprise an epoxy resin, and a polymeric composition which is non-tackey at temperatures up to about 50° C. and can be applied as a hot melt at temperatures between about 150° C. to about 190° C. and comprises a block copolymer having two polystyrene end blocks linked to a substantially saturated polyolefin rubber midblock, a tackifying resin and a liquid polybutene having a molecular weight of about 10,000 or less.

24. A multi glass pane unit comprising two panes of glass separated by a spacer frame with peripheral portions of the panes bonded to the frame surface(s) by the cured residue of a sealant composition provided by combining two separate parts of the sealant composition and where one part comprises a tertiary amine and a polymeric composition having a softening point between about 50° C. to about 190° C. and the polymeric composition comprises a block copolymer having two polystyrene end blocks linked to a substantially saturated polyolefin rubber midblock, a heat reactive phenolic resin and a tackifying resin and where the other part comprises an epoxy resin, and a polymeric composition which is non-tacky at temperatures up to about 50° C. and can be applied as a hot melt at temperatures between about 150° C. to about 190° C. and the polymeric composition comprises a block copolymer having two polystyrene end blocks linked to a substantially saturated polyolefin rubber midblock, a tackifying resin and a liquid polybutene having a molecular weight of about 10,000 or less.

25. A method for sealing a multi-glass pane unit using separate parts of a hot melt sealant composition, one part comprising a heat softenable polymeric composition including an elastomeric block copolymer having two polyolefin rubber end blocks linked to a substantially saturated polyolefin rubber mid-block and a curable epoxy resin and the other part comprising a heat softenable polymeric composition and a curing agent for the curable epoxy resin, said method comprising the steps of:
(a) providing two glass panes each carrying a layer comprising a part of the sealant composition on selected portions of at least one surface of each pane
(b) providing a spacer frame with at least one selected surface carrying a layer comprising a part of the sealant composition, said spacer frame being of substantially uniform thickness and having a shape and size corresponding to the peripheral portions of at least one of said panes;
(c) assembling said unit by positioning said spacer frame between the panes and bringing the separate parts of the sealant composition into contact with each other so that the separate parts can be combined to provide said sealant composition for sealing between the layer carried by each pane and a layer carried by said selected surface(s) of the spacer frame and
(d) applying sufficient heat to soften said layers so that said separate parts can be combined to provide said seal.

26. A method of claim 25 where a layer carried by each pane comprises the part of the sealant composition containing the curing agent.

27. A method of claim 25 where a layer carried by the spacer surface(s) comprises the part of the sealant composition containing the curing agent.

28. A method of claim 25 where the other part comprises a tertiary amine as a curing agent for the epoxy resin.

29. A method of claim 25 where the other part includes an elastomeric block copolymer having two polyolefin rubber end blocks linked to a substantially saturated polyolefin rubber mid-block.

30. A method of claim 25 where the other part includes a polymeric composition having a softening point between about 50° C. and the polymeric composition comprises a block copolymer having two polystyrene end blocks linked to a substantially saturated polyolefin rubber midblock and a heat reactive phenolic resin.

* * * * *

UNITED STATES PATENT OFFICE
CERTIFICATE OF CORRECTION

Patent No. 4,268,553     Dated May 19, 1981

Inventor(s) Taieb Marzouki and Bernd Schweisser

It is certified that error appears in the above-identified patent and that said Letters Patent are hereby corrected as shown below:

Claim 16:  Please change the formula in this claim to read as follows:

Signed and Sealed this

Fourth Day of August 1981

[SEAL]

Attest:

Attesting Officer

GERALD J. MOSSINGHOFF

Commissioner of Patents and Trademarks